Patented June 17, 1930

1,764,928

UNITED STATES PATENT OFFICE

ARTHUR BIDDLE, OF TRENTON, NEW JERSEY, ASSIGNOR TO UNITED PRODUCTS CORPORATION OF AMERICA, A CORPORATION OF DELAWARE

ABRASIVE COMPOSITION

No Drawing.  Application filed June 15, 1926.  Serial No. 116,227.

My invention relates to an abrasive composition comprising rubber, gutta percha, balata or the like in a state of aqueous dispersion and an abrasive material mixed therewith. The rubber or like material may be utilized either in its crude, refined or reclaimed state and may be first dissolved in an organic solvent, for example, gasoline, and then dispersed in aqueous colloidal form by adding water thereto or by mixing an aqueous colloid therewith or the rubber may be put into aqueous colloidal form by mastication through rolls or other suitable means with the aid of water or by subjecting the rubber to the action of heat and water while under agitation. The rubber may be also employed in its latex state, preferably with a preservative such as ammonia added thereto, it then being in its natural aqueous colloidal form. If the colloidal mixture so formed is found not to be sufficiently viscous it may be rendered so by evaporation or by the addition of suitable thickening agents such as bentonite clay or hydrophilic colloids such as casein, glues or starches. When the thickeners or hydrophilic colloids employed are of reversible character then it is preferable to add to the composition an insolubilizing agent such as formaldehyde, or, if desired, the finished product may be treated with the insolubilizing agent. Dehydration of the composition or finished product, if desired, may be accomplished by evaporation or any suitable dehydrating agent.

Among the objects of my invention are to provide an abrasive compound of water resistant character, moldable or otherwise formable into wheels or blocks, and having more or less flexibility or resiliency so that it may be used in delicate grinding operations without destroying or damaging the tool or article which is being ground; to provide an abrasive compound of the character described which may be applied as a coating to paper or fabric or other backing in which flexibility is desired by brush, knife, spray, roller or dipping and which will adhere thereto and, after drying, form a flexible abrasive surface and be used like sand or emery paper; to provide a resilient, abrasive, non-slipping material adapted for use as a tread for stairs or inclined walks, or as a mat, or as a waterproof sole for shoes, or as a non-slip, non-skid tread for vehicle wheels. My new composition will also be found adaptable for many other uses.

When rubber latex or other aqueous rubber dispersion is used a preserving agent preferably of an alkaline nature, such as ammonia, prevents premature coagulation.

As an example of one form of my composition which is adaptable to be molded into a grinding wheel I give the following:—

| | Parts by weight |
|---|---|
| Rubber latex (approximately 35% rubber content) | 100 |
| Bentonite clay | 2 |
| Zinc oxide | 2 |
| Sulphur | 3 |
| Water | 5 |
| Granulated carborundum | 50 |

In carrying out the above form of my invention the clay, zinc oxide and sulphur are preferably first mixed with the water to form a paste; the latex is then added thereto and the mass thoroughly mixed, following which the carborundum is added and mixed therewith in any suitable manner; the plastic composition so formed is then molded into wheels or stones or other desired forms. Granulated carborundum forms a very satisfactory abrasive material but it will be understood that any other suitable abrasive, such as sand, garnet, diamond dust, etc., may also be employed. I have found that the zinc oxide serves as a toughener or strengthener to the rubber in the latex and the sulphur acts as a vulcanizer thereof. It is understood that other strengthening or toughening agents than zinc oxide may be used if desired and also that compounds of sulphur may also be used as vulcanizing agents.

As examples of my composition adaptable for use to form an abrasive surface on a backing, I may use (a)

| | Parts by weight |
|---|---|
| Rubber latex (approximately 35% rubber content) | 100 |
| Colloidal clay | 5 |
| Water | 10 |

Abrasive material as may be required.

(b)

| | Parts by weight |
|---|---|
| Rubber latex (approximately 35% rubber content) | 250 |
| Casein | 50 |
| Casein solvent | 15 |
| Water | 125 |

Abrasive material as may be required.

Example (a) has the greater waterproofing qualities and is the more flexible while Example (b) has greater adhesive properties. Vulcanizing and/or accelerating agents may be utilized in the compositions if desired, or the materials may be vulcanized by the cold cure processes. These compositions may be applied to the backing in any suitable maner.

When a higher degree of resiliency is desired to better adapted my composition to some uses, for example, in mats or treads, this may be secured by adding powdered rubber or comminuted cork or other suitable materials, with or without coloring agents.

While I have herein described some particular compositions embodying my invention and methods of producing the same and also mentioned some of the arts in which my invention may be utilized, it is to be understood that the invention is not limited to those arts or to the precise methods, ingredients or proportions mentioned.

Having thus described my invention, I claim and desire to protect by Letters Patent of the United States:

1. An abrasive composition comprising fifty parts by weight of rubber latex, casein ten parts, a casein solvent three parts, water twenty-five parts, sand eighty parts.

2. The process of making an abrasive composition consisting of combining an aqueous dispersion of rubber with a non-suspended abrasive substance in the presence of an aqueous colloid, removing the water therefrom and then vulcanizing the composition.

3. The process of making an abrasive composition consisting of combining an aqueous dispersion of rubber with a non-suspended abrasive substance in the presence of a hydrophilic colloid, adding an insolubilizing agent to make the hydrophilic colloid water-resisting and then removing the water.

4. The process of making an abrasive composition consisting of combining an aqueous dispersion of rubber with a non-suspended abrasive substance and casein in solution, adding vulcanizing and insolubilizing agents and then removing the water.

In witness whereof I have hereunto set my hand this 14 day of June, 1926.

ARTHUR BIDDLE.